United States Patent
Shreve et al.

(10) Patent No.: US 10,900,902 B2
(45) Date of Patent: Jan. 26, 2021

(54) METHOD FOR SIMULTANEOUS SPECTRALLY RESOLVED DETECTION OR IMAGING OF ITEMS IN MULTIPLE FLOWING STREAMS

(71) Applicant: STC.UNM, Albuquerque, NM (US)

(72) Inventors: Andrew P Shreve, Santa Fe, NM (US); Steven Wayde Graves, Santa Fe, NM (US); Bruce S Edwards, Albuquerque, NM (US); Jaime Javier Juarez, Albuquerque, NM (US)

(73) Assignee: UNM Rainforest Innovations, Albuquerque, NM (US)

( * ) Notice: Subject to any disclaimer, the term of this patent is extended or adjusted under 35 U.S.C. 154(b) by 578 days.

(21) Appl. No.: 15/568,029

(22) PCT Filed: Apr. 20, 2016

(86) PCT No.: PCT/US2016/028388
§ 371 (c)(1),
(2) Date: Oct. 20, 2017

(87) PCT Pub. No.: WO2016/172173
PCT Pub. Date: Oct. 27, 2016

(65) Prior Publication Data
US 2018/0143138 A1 May 24, 2018

Related U.S. Application Data

(60) Provisional application No. 62/149,773, filed on Apr. 20, 2015.

(51) Int. Cl.
*G01N 21/64* (2006.01)
*G01J 3/02* (2006.01)
(Continued)

(52) U.S. Cl.
CPC .......... *G01N 21/6486* (2013.01); *G01J 3/021* (2013.01); *G01J 3/0205* (2013.01);
(Continued)

(58) Field of Classification Search
CPC .......... G01N 21/6486; G01N 15/0211; G01N 15/14; G01N 2015/1006; G01N 15/147;
(Continued)

(56) References Cited

U.S. PATENT DOCUMENTS 5,076,678 A * 12/1991 Grossman ................ G02B 3/06
359/664
6,256,096 B1 7/2001 Johnson
(Continued)

OTHER PUBLICATIONS

Karger et al., "Capillary Electrophoresis of Proteins and Nucleic Acids," Annual Reviews of Biophysics and Biomolecular Structure, 24 (1995) 579-610.

*Primary Examiner* — Hina F Ayub
*Assistant Examiner* — Amanda Merlino
(74) *Attorney, Agent, or Firm* — Gonzales Patent Services; Ellen M Gonzales

(57) ABSTRACT

A method to simultaneously detect emission intensity or images at multiple distinct emission wavelengths in the analysis of parallel sample streams in a flow-based analysis system and apparatus for performing the described method.

20 Claims, 1 Drawing Sheet

(51) Int. Cl.
*G01N 15/14* (2006.01)
*G01J 3/28* (2006.01)
*G01N 15/02* (2006.01)
*G01N 15/10* (2006.01)

(52) U.S. Cl.
CPC .......... *G01J 3/0208* (2013.01); *G01J 3/0291* (2013.01); *G01J 3/0294* (2013.01); *G01J 3/2823* (2013.01); *G01N 15/0211* (2013.01); *G01N 15/14* (2013.01); *G01N 15/147* (2013.01); *G01J 2003/2826* (2013.01); *G01N 2015/1006* (2013.01)

(58) Field of Classification Search
CPC  G01N 15/10; G01J 3/2823; G01J 2003/2826; G01J 3/0208; G01J 3/0205; G01J 3/021; G01J 3/0291; G01J 3/0294
See application file for complete search history.

(56) References Cited

U.S. PATENT DOCUMENTS

| | | | |
|---|---|---|---|
| 8,357,281 B2 * | 1/2013 | Pang | G01N 27/44721 |
| | | | 204/601 |
| 2010/0225913 A1 | 9/2010 | Trainer | |
| 2016/0025557 A1 * | 1/2016 | Morrell | G01N 21/53 |
| | | | 356/442 |
| 2016/0076367 A1 * | 3/2016 | Freese | E21B 49/08 |
| | | | 356/70 |
| 2016/0238511 A1 * | 8/2016 | Cao | G01N 21/6486 |

* cited by examiner

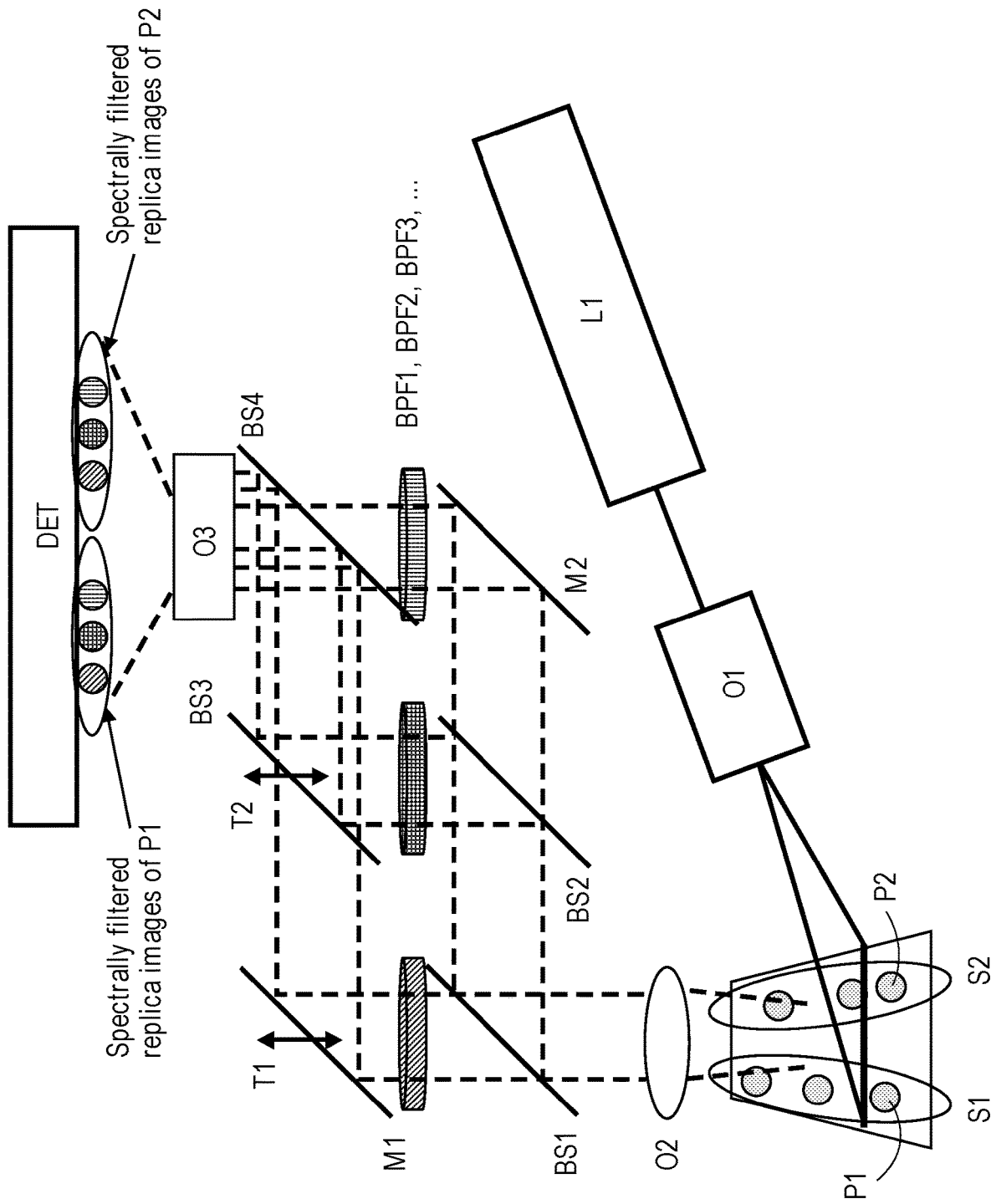

METHOD FOR SIMULTANEOUS SPECTRALLY RESOLVED DETECTION OR IMAGING OF ITEMS IN MULTIPLE FLOWING STREAMS

CROSS-REFERENCE TO RELATED APPLICATIONS

The following application claims benefit of U.S. Provisional Application No. 62/149,773 filed Apr. 20, 2015, which is hereby incorporated by reference in its entirety.

SUMMARY

According to an embodiment the present disclosure provides a method to simultaneously detect emission intensity or images at multiple distinct emission wavelengths in the analysis of parallel sample streams in a flow-based analysis system and apparatus for performing the described method. In general, the described technique utilizes the generation of multiple replica images, with each image passing through distinct spectral filters, displaced side-by-side on an imaging detector, implemented in combination with flowing streams of particles in defined spatial positions. The particles, which may be of any type, including but not limited to polymer or silica particles or cells, may be spatially focused by any convenient means (e.g., hydrodynamic focusing, acoustic standing wave focusing). Typical particle sizes are in the range of a few microns, but could be substantially smaller (sub-micron) or larger (tens of microns).

BRIEF DESCRIPTION OF THE DRAWINGS

FIG. 1 is a schematic illustration of an exemplary detector according to an embodiment of the present disclosure.

DETAILED DESCRIPTION

According to an embodiment the present disclosure provides a method to simultaneously detect emission intensity or images at multiple distinct emission wavelengths in the analysis of parallel sample streams in a flow-based analysis system and apparatus for performing the described method. In general, the described technique utilizes the generation of multiple replica data points or images, with each image passing through distinct spectral filters, displaced side-by-side on an imaging detector, implemented in combination with flowing streams of particles in defined spatial positions.

For the purposes of the present disclosure, the term "particle" is used to refer to a portion of matter typically that is typically a few microns (i.e. between 1 um and 10 um) in size, although it will be appreciated that the particles could be substantially smaller (sub-micron) or larger (tens of microns). The term "particle" is not intended to convey any particular shape or function. Particles may be naturally occurring or man-made and may or may not include functional groups or other modifications. For ease of discussion, unless otherwise defined by context, the term "particle" as used herein, is intended to be inclusive of biological and non-biological materials including cells, protein molecules, bacteria, multi-cellular aggregates and other organisms or structures of similar size. Accordingly, particles suitable for use with the methods and apparatus of the present disclosure include, but are not limited to, polymer or silica particles, cells, protein molecules, bacteria, multi-cellular aggregates, etc.

In general, the present disclosure provides a detection method that is applicable for use with multiple (that is, more than one), parallel, spatially focused, flowing particle streams, where typically, particles in each stream are analyzed individually as they flow through an interrogation region. According to various embodiments, the particle streams may be spatially focused by any convenient means including, for example, hydrodynamic focusing or acoustic standing wave focusing, including embodiments where multi-stream focusing occurs either in one individual or in many separate channels etc. The use of acoustic focusing to achieve multiple, parallel, fluid streams is described, for example, in U.S. Pat. Nos. 8,830,451 and 9,074,977, each of which is hereby incorporated by reference.

According to a first embodiment, beam-shaping optics generate a light source that illuminates particles within the multiple parallel flowing sample streams. Particles passing through the excitation area emit multiple colors of light, which may include light scattering, fluorescence or luminescence emission from one or more reporter labels that have attached to the particle, or fluorescence or luminescence emission from one or more chromophores embedded in the particle. These multiple colors of emitted light are spectrally separated, detected, and presented as replica images, each replica corresponding to a particular detection wavelength, with the replica images distributed across the face of the detector. For ease of discussion, unless context dictates differently, the terms "label" or "detectable label" are used to refer to the different characteristics (i.e. attached reporter labels, embedded chromophores, light scattering) present on or in the particles which produce the emissions that are detected by the system described herein.

It will be understood that different particles could be labeled differently (i.e. with different sets of labels) and that such differences would then correspond to a difference in the set of replica images produced for each particle. For example, a first particle could have two labels—a label that emits red light and a label that emits blue light. A second particle could have three labels—a label that emits red light, a label that emits blue light, and a label that emits yellow light. In this case, only those filters that correspond to the red and blue lights would produce replica images for the first particle while the filters that correspond to the red, blue and yellow lights would each produce a replica image for the second particle. Of course in practice, any number and combination of labels could be used, so long as the system is able to accommodate the needed number of filters, enabling the quick identification and differentiation of a wide number and variety of differently labeled particles.

Suitable optical systems for illuminating the particles include free space or fiber coupled lasers and light emitting diodes. Fluorescence or other emission from particles present in the illuminated particle streams is collected through imaging optics. Importantly, in this embodiment, the data that is collected need not be a high resolution image as would be collected in typical microscopy applications, but is, instead a low resolution image adequate for particle detection or analysis. For the purposes of the present disclosure, the term "high resolution" means spatial frequencies above 100 line pairs per mm. In contrast, the term "low resolution" means spatial frequencies less than 100 line pairs per mm. According to this embodiment, the emission first passes through a wavelength-selective (dichroic) filter that transmits light longer than a particular wavelength, with the primary purpose of removing scattered light from the excitation source. After passing through this initial filter, the emission light is passed through a series of partially reflective and dichroic filters in order to produce replica images, positioned side-by-side (i.e. laterally displaced) on an imaging detector, where each replica corresponds to emitted light in a different wavelength range. There are several possible optical arrangements that could effectively lead to similar outputs on the detector.

Turning now to FIG. 1, one such arrangement is shown that has the specific attributes of: (1) producing side-by-side replica images with relative intensities that can be controlled by choice of reflectivity of the partially reflective beamsplitters, (2) having minimal path length differences between each image so that all images may be expected to be equally sharply focused (that is the path length differences of each replica will be within the depth of field of the overall optical imaging system).

The focused streams (S1 and S2) shown in FIG. 1, are just two out of a large number of streams that can be generated by the above-identified techniques. The particles (P1 and P2) in the streams may be either themselves individually labeled by chromophores of specific emission wavelengths or multiple chromophores may be used on single particles as part of an imaging or measurement approach. In one experimental arrangement, the excitation light is provided by a light source (L1), shaped by optics (O1) to provide an excitation line spanning all cell streams. The light emitted from the sample (e.g., fluorescence or scatter) is collected though optics (O2). The collected light impinges upon a series of partially reflective beamsplitters (BS1 & BS2) and finally reflects off a mirror (M2). This produces three parallel replica beams, each of which can pass through independent spectral bandpass filters (BP1, BP2 and BP3), whereupon they can be recombined using a combination of mirrors (M1 and beamsplitters (BS3, BS4). M1 and B S3 are mounted on translation and beam steering stages (T1, T2), which allows the beams they reflect to be displaced spatially and directionally steered by small amounts. Following recombination of all the beams, a set of optics (O2) generates focused images on the detector (DET), which could be, for example, an imaging detector or camera. For each stream, the images generated consist or comprise of multiple, spectrally distinct replicas of the particle being illuminated. (In general, the generated images consist of the replicas of the particle, but in the interest of complete accuracy, in some cases the images may include background information between the particle images.) The replica images appear on the imaging detector in the otherwise unused space between the imaged streams. Of course it will be understood that the imaging detector or camera may further include or be in communication with a display or other device capable of presenting the replica images and/or other generated data to a user.

The schematic in FIG. 1 illustrates the generation of three separate images for each particle stream. Other alternatives are possible, including modification of the same methodology to produce a different number of replica images than shown in FIG. 1, either reducing to two or extending to more than three, each with a specific wavelength filter. The number of images is limited only by the space between the sample streams, as this space corresponds to the area on the detector that is being used to measure the replica images. In practice, this limitation is related to the number of overall sample streams, their spatial separation in the sample cell, the size of the imaging detector, and the magnification factor of the imaging system.

Other alternatives to the overall schematic include the use of alternative optical elements, including exchange of partially reflective mirrors with dichroic filters or diffraction gratings, which may replace or supplement the transmission bandpass filters used in each beam path. Optimal choices of these reflective or transmissive elements would normally be guided by the desired application in terms of number of parallel replicas needed and the overall sensitivity required. For example, in the schematic shown in FIG. 1, light intensity will be lost due to the use of partially reflective mirrors, and these losses could become limiting for the analysis of very weak signals. Use of dichroic filters for spectral separation and recombination could greatly reduce these losses. Either beamsplitters or dichroic filter properties can also be chosen to optimize the intensity of each spectral image, so that the overall system performance can be matched to a particular experimental need (e.g., compensations for different chromophore light-emitting efficiencies, amount of chromophore expected to be present, spectral bandwidth or other factors that might influence the signal in each wavelength range). In practice, in any given application, the optimal choice of optical elements will be driven by a trade-off between desired system performance (minimizing optical losses) and the expense of specialized optical elements.

Finally, in addition to detecting intensity in each replica image, it will be understood that image information can also be obtained. That is, each replica is a full duplicate (low or high resolution) image of the detected particle. Thus, the system could be used to obtain multiple images of each illuminated particle, where each image of a given particle is for a different wavelength range, and all the images of each particle are in registry with one another. Such a configuration could be used in applications such as imaging cytometry, where multi-spectral images of individual cells could be obtained as they passed through the excitation beam in each of the focused streams. This approach, especially if coupled to methods for generating large numbers of parallel focused streams, would lead to acquisition of multi-color spectral images for large numbers of cells in a short period of time.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims. As used herein and in the appended claims, the singular forms "a," "an," and "the" include plural reference unless the context clearly dictates otherwise.

What is claimed is:

1. A method for simultaneously detecting emission intensity or images at multiple distinct emission wavelengths in the analysis of parallel particle streams comprising:
   providing multiple parallel streams of flowing particles;
   collecting excitation emissions from an individual particle in the multiple parallel streams;
   producing replica images of the excitation emissions of the individual particle; and simultaneously projecting the replica images onto a detection device.

2. The method of claim 1 wherein the replica images are laterally displaced and projected on the detection devices in the space between the imaged streams.

3. The method of claim 1 further comprising directing an excitation light across all of the multiple parallel streams such that the excitation light produces an excitation line across the multiple parallel streams.

4. The method of claim 2 wherein:
collecting excitation emissions comprises collecting the excitation emission from a first particle in a first stream and collecting the excitation emission from a second particle in a second stream; and wherein
producing replica images of the excitation emissions comprises producing a first set of replica images of the first particle and a second set of replica images of the second particle; and
wherein
the first set of replica images is projected onto the detection device in a location that correlates to the space between the first stream and the second stream.

5. The method of claim 1 wherein each replica image has been passed through a different filter or other wavelength selective element such that each replica image presents different spectral information to the detection device.

6. The method of claim 5 wherein each filter selects for or against a specific wavelength range.

7. The method of claim 5 wherein each image is a low resolution image.

8. The method of claim 1 wherein producing replica images of the excitation emissions comprises passing the excitation emissions through a series of filters, beam splitters, and/or mirrors.

9. The method of claim 1 wherein an excitation light is provided by a light source and shaped by first optics to provide an excitation line spanning the multiple cell streams;
the excitation emissions emitted from each of the particles are collected though the first or second optics; and
the collected excited emissions impinge upon a series of partially reflective beamsplitters and reflect off a mirror to produce parallel replica beams.

10. The method of claim 9 wherein each parallel replica beam passes through an independent spectral bandpass filter, whereupon they are recombined using a combination of mirrors and beamsplitters.

11. The method of claim 10 wherein third optics generate focused images on the detection device.

12. The method of claim 10 wherein at least some of the mirrors and beamsplitters are mounted on translation and beam steering stages.

13. A detection apparatus comprising:
an excitation emission collector that collects excitation emissions from individual particles flowing in multiple parallel flow streams;
one or more devices that derive different information from each collected excitation emission to produce differentiated replica images from each particle; and
a detector that simultaneously receives each of the differentiated replica images.

14. The apparatus of claim 13 further comprising an excitation light producer that delivers an excitation light across all of the multiple parallel streams such that illumination spans all the particle streams at a single fixed point in the particle stream.

15. The apparatus of claim 13 further comprising a series of filters, beam splitters, and/or mirrors to produce the differentiated replica images.

16. The apparatus of claim 15 comprising a filter that selects for a specific wavelength range.

17. The apparatus of claim 16 comprising a second filter that select for a second specific wavelength range.

18. The apparatus of claim 13 wherein the detector receives the differentiated replica images as laterally displaced images positioned in an area corresponding to the space between the multiple parallel flow streams.

19. The apparatus of claim 18 wherein the detector presents the differentiated replica images to a user.

20. The apparatus of claim 13 wherein the replica images are low resolution images.

* * * * *